(12) United States Patent
Micovic et al.

(10) Patent No.: US 9,613,408 B2
(45) Date of Patent: Apr. 4, 2017

(54) HIGH DYNAMIC RANGE IMAGE COMPOSITION USING MULTIPLE IMAGES

(71) Applicants: Ivan Micovic, Belgrade (RS); Aleksandar Sutic, Belgrade (RS); Visnja Krsmanovic, Belgrade (RS); Dusan Stevanovic, Belgrade (RS); Marko Sredic, Belgrade (RS); Pavle Petrovic, Belgrade (RS); Dalibor Segan, Belgrade (RS); Vladimir Kovacevic, Pancevo (RS); Aleksandar Beric, Eindhoven (NL)

(72) Inventors: Ivan Micovic, Belgrade (RS); Aleksandar Sutic, Belgrade (RS); Visnja Krsmanovic, Belgrade (RS); Dusan Stevanovic, Belgrade (RS); Marko Sredic, Belgrade (RS); Pavle Petrovic, Belgrade (RS); Dalibor Segan, Belgrade (RS); Vladimir Kovacevic, Pancevo (RS); Aleksandar Beric, Eindhoven (NL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/496,858

(22) Filed: Sep. 25, 2014

(65) Prior Publication Data
US 2016/0093029 A1    Mar. 31, 2016

(51) Int. Cl.
*G06T 5/00* (2006.01)
*G06T 5/50* (2006.01)
(Continued)

(52) U.S. Cl.
CPC ............ *G06T 5/009* (2013.01); *G06T 3/0068* (2013.01); *G06T 5/006* (2013.01); *G06T 5/50* (2013.01);
(Continued)

(58) Field of Classification Search
CPC ..................................................... H04N 5/2355
(Continued)

(56) References Cited

U.S. PATENT DOCUMENTS

| | | | |
|---|---|---|---|
| 2005/0013501 A1* | 1/2005 | Kang | G06T 7/2066 382/254 |
| 2007/0115392 A1* | 5/2007 | Masuda | H04N 5/20 348/678 |

(Continued)

FOREIGN PATENT DOCUMENTS

JP     2013/240031      11/2013

OTHER PUBLICATIONS

PCT International Search Report and Written Opinion of the International Searching Authority for International Application No. PCT/US2015/047211, dated Jul. 12, 2016, 13 pages.

*Primary Examiner* — Roberto Velez
*Assistant Examiner* — Cynthia Segura
(74) *Attorney, Agent, or Firm* — Blakely, Sokoloff, Taylor & Zafman LLP

(57) ABSTRACT

High dynamic range image composition is described using multiple images. Some embodiments relate to a system with a buffer to receive each of three different images of a scene, each image having a different amount of light exposure to the scene, as general purpose processor to estimate the alignment between the three images, and an imaging processor to warp the images based on the estimated alignment and to combine the three images to produce a single high dynamic range image.

22 Claims, 9 Drawing Sheets

(51) Int. Cl.
*G06T 7/00* (2006.01)
*G06T 7/40* (2006.01)
*H04N 5/235* (2006.01)
*H04N 9/04* (2006.01)
*G06T 3/00* (2006.01)
*H04N 101/00* (2006.01)
*H04N 5/77* (2006.01)

(52) U.S. Cl.
CPC .......... *G06T 7/0038* (2013.01); *G06T 7/0065* (2013.01); *G06T 7/408* (2013.01); *H04N 5/2355* (2013.01); *H04N 9/045* (2013.01); *G06T 2207/10004* (2013.01); *G06T 2207/10016* (2013.01); *G06T 2207/10024* (2013.01); *G06T 2207/10028* (2013.01); *G06T 2207/20208* (2013.01); *G06T 2207/20221* (2013.01); *G06T 2207/30168* (2013.01); *G06T 2210/36* (2013.01); *G06T 2210/61* (2013.01); *H04N 5/772* (2013.01); *H04N 2101/00* (2013.01)

(58) Field of Classification Search
USPC ....................................... 348/222.1
See application file for complete search history.

(56) References Cited

U.S. PATENT DOCUMENTS

| | | | |
|---|---|---|---|
| 2009/0110194 A1* | 4/2009 | Athsani | G06F 21/606 380/200 |
| 2010/0246967 A1* | 9/2010 | Ando | G06T 5/009 382/190 |
| 2011/0170768 A1* | 7/2011 | Alldrin | G06K 9/4661 382/159 |
| 2011/0254976 A1 | 10/2011 | Garten | |
| 2012/0002899 A1* | 1/2012 | Orr, IV | G06T 5/50 382/282 |
| 2012/0147139 A1* | 6/2012 | Li | G03B 35/08 348/43 |
| 2014/0176731 A1* | 6/2014 | Geiss | G06T 7/0024 348/207.1 |
| 2014/0267883 A1 | 9/2014 | Vidal-Naquet | |
| 2014/0347521 A1* | 11/2014 | Hasinoff | H04N 5/2355 348/239 |
| 2015/0036878 A1* | 2/2015 | Nashizawa | G06T 5/50 382/103 |
| 2016/0037044 A1* | 2/2016 | Motta | G06T 5/007 348/221.1 |
| 2016/0125575 A1* | 5/2016 | Takahashi | G06T 5/50 382/275 |

* cited by examiner ated. This may also
HIGH DYNAMIC RANGE IMAGE COMPOSITION USING MULTIPLE IMAGES

FIELD

The present description pertains to compositing multiple images to create a high dynamic range image.

BACKGROUND

Small digital cameras have become so inexpensive as to be offered on a wide range of portable and wearable devices from watches, to helmets, to computing tablets, to media players to cellular telephones of all kinds. Typical digital sensors have many limitations in the quality of the images that they can produce for still and video photography. Further limitations stem from the limits in digital camera cost and size. For CCD (Charge Coupled Device) and even more for CMOS (Complementary Metal Oxide Semiconductor)-based sensors, the sensor is unable to capture the full contrast between light and dark areas of many scenes. Smaller sensors have an even smaller contrast range than larger sensors.

The range in the irradiance of the scene being photographed often exceeds the ability of a typical digital camera sensor. While the irradiance of bright areas striking the sensor can be reduced using a shutter or optical device, this also reduces the irradiance of the dark parts of the scene. Similarly the irradiance of a dark scene can be increased with a larger lens or longer exposure but this can cause the bright areas to exceed the sensor's limits. The sensor is therefore unable to capture the brightest and the darkest parts of the scene simultaneously. In other words, the sensor is unable to capture the scenes full dynamic range. Therefore, scenes that contain both very bright (e.g. sunlight) and very dark (e.g. shadow) areas are challenging for such sensors. As a result, the details of either very bright or very dark areas are captured but not both. Significant information available in the scene is lost, finally resulting in a poor user experience in terms of image quality.

In order to compensate for the sensors, many cameras use a technique referred to as HDR (High Dynamic Range) photography or imaging. The full irradiance of the scene is captured by taking multiple images of the same scene with different exposure settings by changing a shutter speed or lens aperture. The images are then combined into a single HDR image that includes detail in both dark and light areas of the scene.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

HDR (High Dynamic Range) composite image creation requires significant computational and memory resources. All of the images must be stored, registered and combined in an amount of time that is convenient for the user. For handheld cameras or cameras held on moving platforms, the pixels of the images will not be aligned. For scenes with moving objects, the objects will not be aligned. The non-alignment comes because the images are taken at slightly different times. Any movement of the camera or within the scene will cause features of the images to be misaligned. If the images are taken simultaneously from different image sensors, then the images will not be aligned because the different sensors are located in different physical locations on the camera. This can cause motion artifacts in the resulting HDR image. Accordingly, the images must be analyzed and registered to each other. The difficulty increases as image sensors generate more pixels. Increased computational demands also increase power requirements which may drain the battery of a portable device more quickly. The technique described herein executes quickly on low-power mobile platforms. The multiple images are blended into a single HDR image, while compensating for local and global motion between them.

A modular approach is described herein with a unique sequence of modular stages. The modules include a de-ghosting engine with robust local motion detection that prevents severe motion artifacts. A color or chroma or chromaticity processing module preserves a natural look and feel for the output image, which can be tuned to meet different user preferences. An irradiance map may be used as input for high-contrast displays, but also as an input for tone mapping operators which may extract high contrast images suitable for standard displays. The modules may be implemented in less time than other HDR techniques.

Figure 1A:
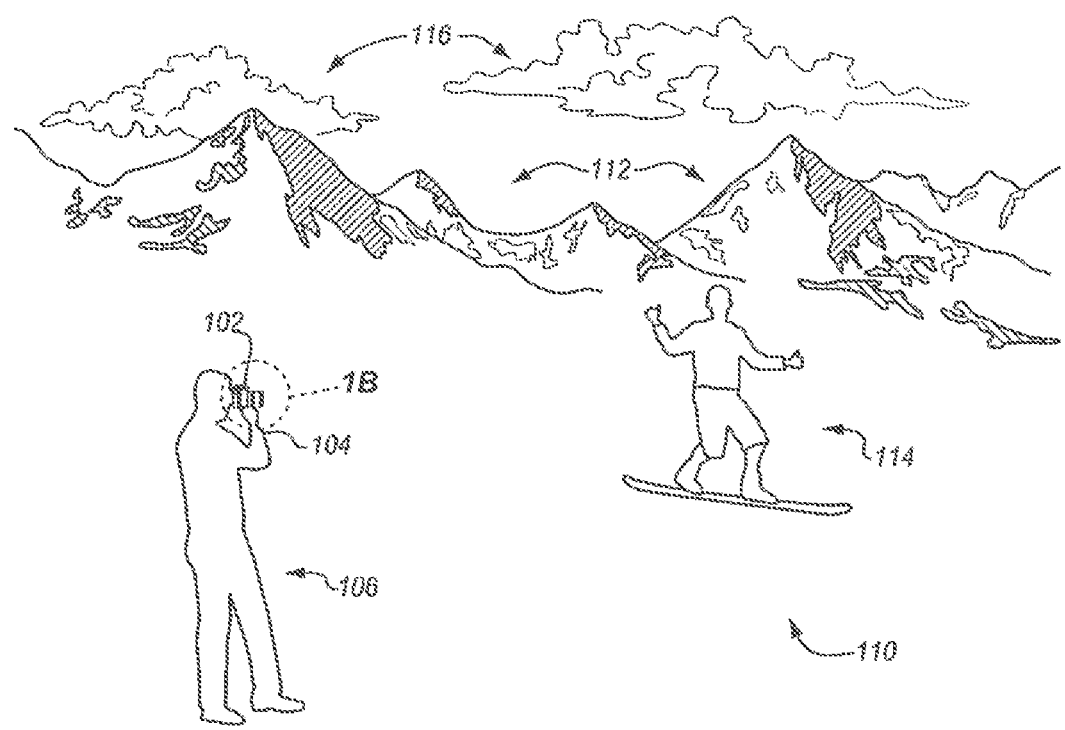
FIG. 1A is a diagram of capturing a photograph in a high contrast environment.

FIG. 1A is a diagram of a digital camera that is capturing a scene. The camera 102 is held in the hand 104 of a photographer 106 who is aiming the camera at a scene 110. The camera is likely to shake or jitter in the hand of the photographer because it is not stabilized. This may also occur if the photographer has mounted the camera to a larger platform (not shown) such as a vehicle which is not stabilized. The photographer has aimed the camera at a scene which has as fixed mountain background 112 and a moving foreground object 114 such as a snowboard rider. The scene also has moving background clouds 116. This is provided as a common example but the elements in the scene may be varied to suit the desires of the photographer.

Figure 1B:
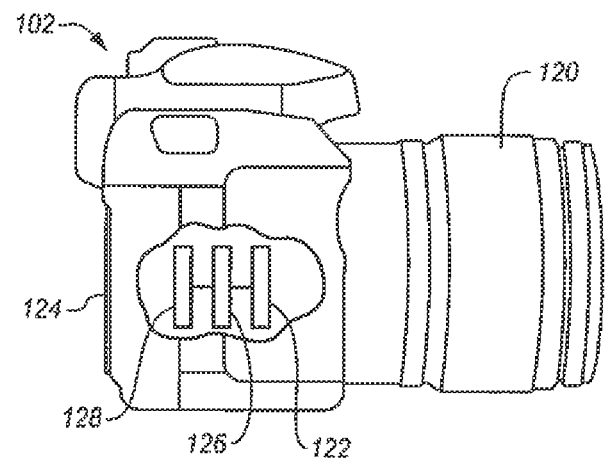
FIG. 1B is a diagram of a video capture device.

The camera 102 is shown in an expanded diagram view in FIG. 1B with a lens 120 to image the scene onto an image sensor 122. There may be shutters, controllable aperture diaphragms, filters, shades and other elements (not shown) between the lens and the image sensor. The image sensor data is provided to a sample and hold circuit 126 to convert the data into a set of pixel values. The pixel values are then processed in an image processor 128. The system is controlled by a general purpose processor 130 which presents a user interface and image view on a touchscreen display 124 and may present one or more additional user interface and communication elements. The camera may have many more or fewer components than shown, depending on the particular implementation. The described techniques and hardware may be used for any of a variety of different types of cameras including those in smartphones, media players, watches, glasses, and other wearable devices, as well as larger dedicated cameras for still or video photography.

Figure 2:
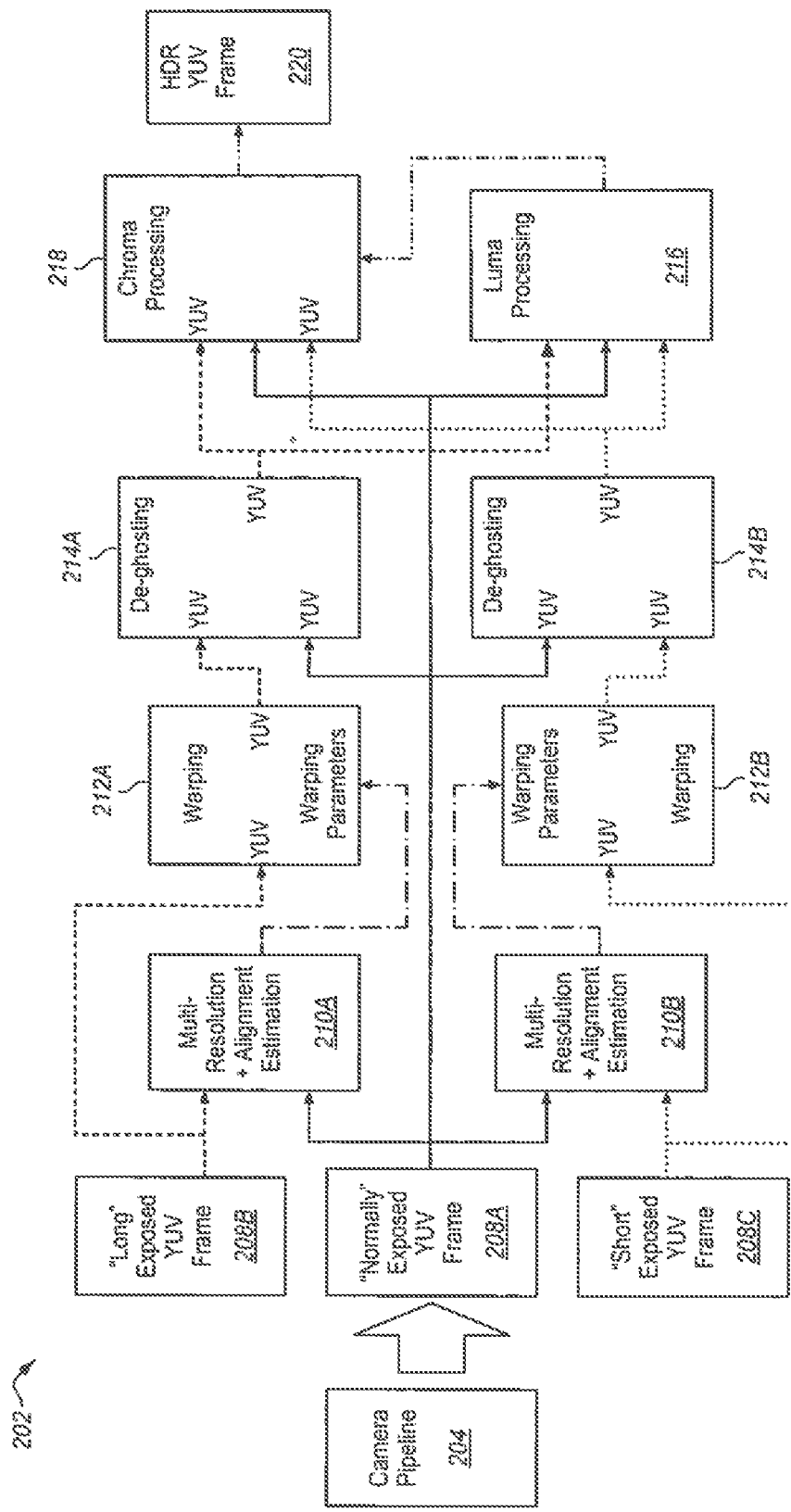
FIG. 2 is a block diagram of an image processing pipeline for high dynamic range processing according to an embodiment.

FIG. 2 is a block diagram of an HDR processing pipeline that may be implemented in a single processor with one or more cores or in multiple processing modules. The technique is implemented in stages including multi-resolution, alignment estimation, warping, de-ghosting, luma processing and chroma processing. The multi-resolution and alignment estimation stages may be implemented based on robust dominant motion estimation, or in a variety of other ways. In embodiments, a multi-resolution engine equalizes input luma planes and performs downscaling (e.g. Gaussian pyramid de-composition) in order to prepare inputs for scale-space, coarse-to-fine image alignment estimation.

As shown in FIG. 2, three images each come into respective image buffers 208A, 208B, 208C from a camera pipeline 204 to the HDR imaging system 202. One or more images may be stored in each corresponding buffer. While three images are shown, more or fewer may be used depending on the particular implementation. Each image is a frame in a YUV color space in this particular example, however, other color spaces may be used depending upon the particular implementation. The first image 208A is a normally exposed image, that is the image has been exposed as determined to be proper by the camera or some other exposure determination device such as a light meter.

The second image 208B is an over exposed image, that is an image with a longer exposure or a larger aperture. The third image is an under exposed image, that is an image with a shorter exposure time or a smaller lens aperture. Typically the normally exposed image is taken in between the other two images in time, however, the ordering of the images may be modified to suit any particular implementation. The images are connected together in pairs. The normally exposed image 208A is selected as the reference frame and this image is paired with the over exposed image 208B in one case to make a first pair and the under exposed image 208C in the other case to make a second pair. Accordingly, there is a first pairing of the reference with the over exposed image and a second pairing with the under exposed image. If there are more than three images then more pairings may be made.

While the present processes are described in the context of making adjustments for dark and bright areas in the reference image, any of the images may be used as the reference image. In addition, the reference image is not necessarily correctly exposed. Using multiple images to bracket the exposure or irradiance, it is not necessary to determine a correct exposure in advance. The different images may be combined as described and provided that there is a sufficient range in exposure for the scene, a suitable composite image may be created.

The first pair consisting of the reference image and the over exposed image is applied to a multi-resolution and alignment estimation block 210A through a connection to the respective buffers 208A, 208B. The second pair is applied to a second multi-resolution and alignment estimation block 210B through a connection to the respective buffers 208A, 208C. In order to aid in the understanding of the data pathways, data related to the over exposed image is represented as a dashed line, data related to the reference frame is represented as a solid line, and data related to the under exposed image is represented as a dotted line. From the multi-resolution and alignment estimation blocks, the images are then warped. As shown in FIG. 2 the alignment estimation is applied to a connected warping block 212A for the first pair. In addition, the over exposed image is also connected from the buffer to warping 212A. The warping then adjusts the alignment of the over exposed image to match that of the reference image 208A. Similarly, the alignment estimation block applies warping parameters to a second warping 212B and these warping parameters are then applied to the under exposed image 208C so that it is then aligned with the normally exposed image 208A.

The alignment estimation module, calculates motion between the reference image and the other two or more images. The calculated motion usually corresponds to movement of the image sensor or the camera against a fixed background scene due to movements made by the photographer. However, the calculated motion may also correspond to movement of a platform upon which the camera or the photographer is resting. For example, if the images are taken from a window of a moving vehicle or on a shaking platform, then the vehicle will move with respect to the scene between each image. This occurs even if the camera does not move with respect to the vehicle.

The parameters produced by this motion calculation are suitable for use by the warping engine and are sent from the alignment estimation modules 210A, 210B to the corresponding warping module 212A, 212B as shown by the dashed and dotted lines. The warping engine applies the calculated motion parameters and the alignment estimation from the connected module. It registers all of the input frames against each other. The pixels of the input images then are aligned so that they may be combined to produce an HDR image. A warping and scaling matrix may be used.

With all of the images aligned through warping, the over exposed image and reference frame are then applied to de-ghosting 214 which is connected to the warping. The de-ghosting block compares the reference frame to the secondary frame in the pair and then removes ghosts in the secondary frame based on the reference frame. Warping and de-ghosting are techniques used to align images that are taken at different times. Because the three images are taken at different times the camera may be moved from one image to the next. This is corrected by warping. By determining how reference points in an image align with the orientation of the overall image, the image can be re-oriented using features in the image to match up with the way those same features are oriented in the reference image.

While warping addresses movement of the camera, de-ghosting compensates for movement of items within an image. If, for example as shown in FIG. 1, the subject 114 shown in the foreground has moved from the time that the first image is captured until the time that the next image is captured then the subject 114 may be shifted in position. De-ghosting, shifts the subject position in the over exposed image to match the position of that subject in the reference frame. After de-ghosting 214A, 214B, the aligned and de-ghosted images are passed to luma processing 216 and then to chroma processing 218. The data obtained from the luma processing is supplied to the chroma processing to enhance that processing. After the chroma processing the images may be combined to produce a single HDR image that may be stored in a buffer 220 for display, transmission, or further processing. Alternatively, and as described herein, the images may be combined before the luma and chroma processing stages.

Figure 3:
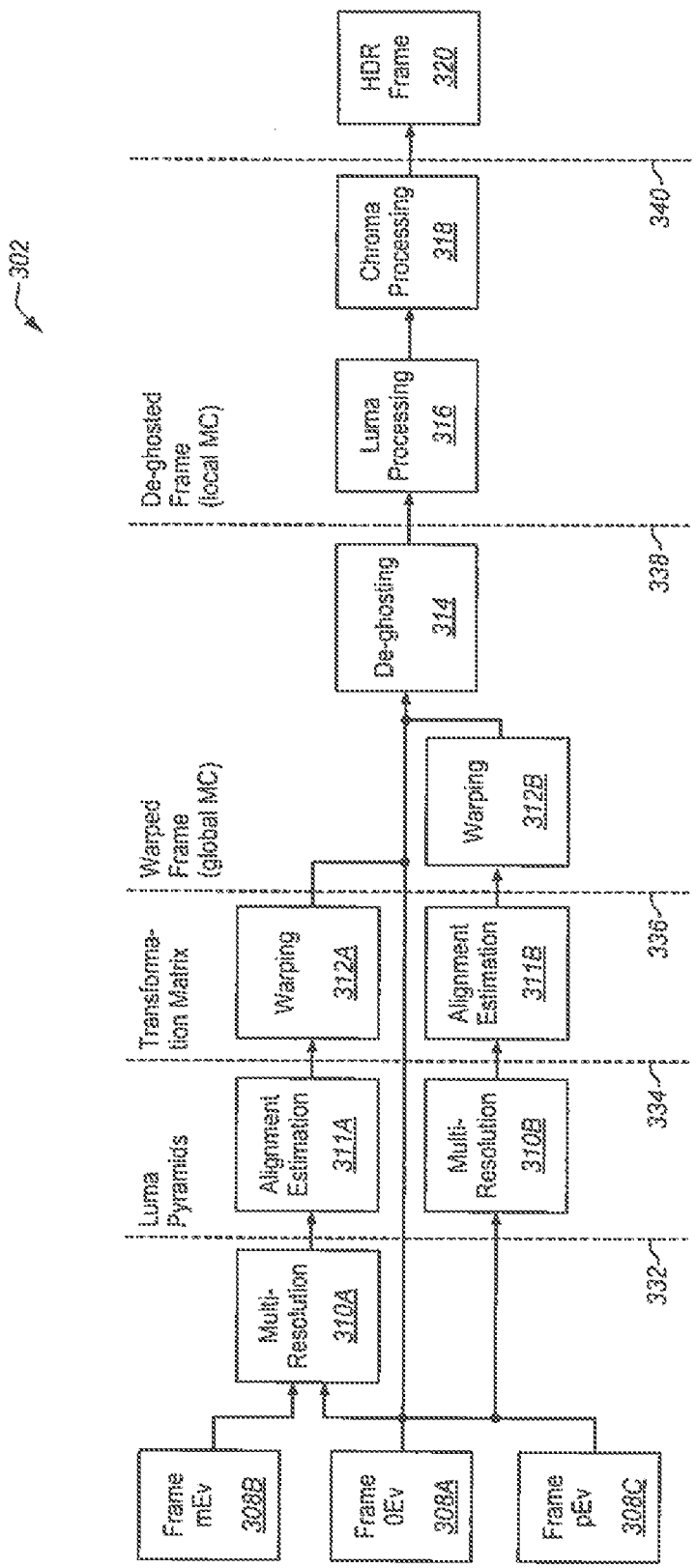
FIG. 3 is an alternative block diagram of the image processing pipeline of FIG. 2 for high dynamic range processing according to an embodiment.

FIG. 3 is a block diagram showing the same operations and functional modules of FIG. 2 from a different perspective. FIG. 2 shows the operations from a functional perspective with detailed connections lines showing the input and outputs of each of the functional modules. In the example of FIG. 3, the operations are shown from a timing perspective in an embodiment configured to support multiple processors. The three images are received into buffers 308A, 308B, 308C from the camera pipeline indicated at the left end of FIG. 3. These images are then applied to various modules in a processing pipeline 302 to produce an HDR frame 320 on the right.

The first process is for the first pair of images to be applied to a multi-resolution block 310A. After this happens the first pair may then be applied to alignment estimation 311A. For the second pair, however, the multi-resolution block is delayed until a first time interval or time cycle 332 has been passed. For the first time cycle only multi-resolution processing is performed and only on the first pair. In a second time cycle marked by a second boundary 334, alignment estimation 334 is performed on the first pair based on the multi-resolution processing 310A. In addition, multi-resolution processing is applied to the second pair 310B. The first pair alignment estimation and the second pair multi-resolution are applied at the same time.

In a third cycle marked by a third boundary 336, the first pair is passed from alignment estimation to warping 312A. A second pair is passed from multi-resolution to alignment estimation 311B. Accordingly, the alignment estimation and the warping are performed during the same cycle. In a fourth cycle marked by boundary 338 warping is applied to the second pair and de-ghosting 314 is applied to both pairs. In the fourth cycle 340 luma processing 316 is applied to the de-ghosted images, chroma processing 318 is then applied, and the result is an HDR frame 320 formed from the data contained in all three of the original saved input images 308A, 308B, 308C.

The time cycles that divide the operations indicate how tasks may be shared between different resources. In this example, an image processor may be engaged 100% in multi-resolution estimation for the first pair and then for the second pair and in the third cycle for warping of the first pair and in the fourth cycle for warping of the fourth pair. However at the same time a general processor may be engaged to perform alignment estimation 311A, 311B while the image processor is performing other tasks. These tasks are then scheduled in a staggered order so that different resources can perform different processes at the same time. This allows the HDR image to be processed more quickly and with less processing demand on the imaging processor. A variety of different allocations of tasks between different processors are possible depending upon the nature of the particular processors. The different processing resources may be different cores of the same processor, different processors in a single package or different processors, that are in different packages. The different processors may include imaging signal processors, graphics processors, arithmetic co-processors, and other types of processors.

Figure 4:
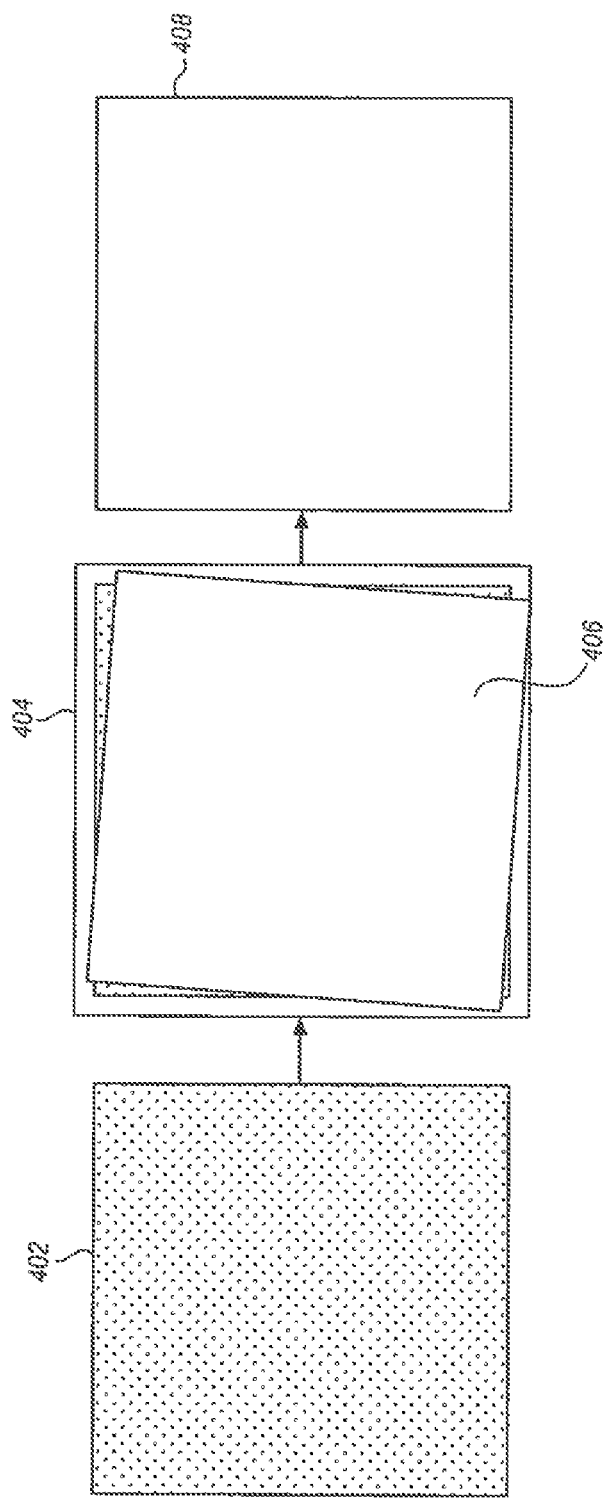
FIG. 4 is a diagram of dewarping two images according to an embodiment.

FIG. 4 shows an example of how warping 312A, 312B may be performed using diagrams of image borders. The first image on the left 402 is an input reference frame. For warping, a border 404 is first calculated for the input reference frame 404 as shown in the center. Next the alignment of a second frame 406, shown in the center, is determined. This alignment is then imposed on the second image 406. As shown in the center of the diagram, when features of the scene in the two images are aligned, then the border of the second image is rotated, in this case clockwise, by a few degrees. By performing warping, the frame of the image is adjusted to obtain a de-warped image 408 on the right of the diagram. In this image the frame of the secondary image is aligned with a border which is aligned with the border 404 of the reference image. This de-warping allows the two images to be combined without concern for aligning the features of the image. Pixels on one image correspond directly with the same pixels on the next image.

In one hardware implementation, warping is done on a dedicated GDC (Geometric Distortion Correction) hardware block or any other hardware acceleration block inside an ISP (Imaging Signal Processor) according to the estimated matrix. However, other hardware or software implementations may be used. In order for GDC to keep the same output resolution as the input resolution, warped frames may be padded. The padding may be done in any of a variety of different ways. One simple way is through simple pixel replication. The missing pixels at the edge of the frame are added by copying nearby pixels. Other blocks in the HDR processing ensure that artifacts from the padding, warping, and other processes are attenuated.

In HDR composition, local motion compensation is a common pitfall, because the time that elapses between captured images can be significant. Regions affected by movement of scene elements in the regions may be selected from one single frame, typically the reference frame, to avoid any movement artifacts. The region that is affected by motion may then be tone mapped in the same manner as the rest of the scene.

An exposure fusion algorithm may be used with a dedicated de-ghosting algorithm for removing all local movement from a fused result. The exposure fusion may be used to compensate for local motion, and to also compensate for other differences between the three images. Differences may be caused by poorly aligned images, glare, etc. In some embodiments, the differences are compensated for by taking regions that have significant differences from only one frame. This is normally the reference frame, which is the frame that has the normal exposure level. This level corresponds to the level of exposure of an image sensor to a scene.

The auto-exposure system typically attempts to choose the subject of most interest in a photographed scene and then select an exposure level that averages the bright and dark areas of the chosen subject. The reference frame therefore has the most detail for the most important parts of the scene. The exposure level is normally determined either by the duration of the exposure of the image sensor to the scene or by a size of an aperture between the image sensor and the scene or by a combination of both or by changing analog or digital gain. In some cases, the amount of illumination applied to a scene (such as a flash exposure level) can be adjusted. However, when the chosen subject has very bright or very dark areas there may be no exposure level that can capture the entire scene. When there are multiple subjects or no clear subject, then the auto-exposure system may not choose the desired subject and therefore not choose the best exposure time for that subject.

The de-ghosting operation 314 is performed early in the pipeline 302 toward the beginning of the HDR processing, after image alignment 311A, 311B and warping 312A, 312B. The three images are modified using alignment and warping so that they more closely resemble images that were captured at the same time. The frame with an automatically determined exposure or exposure that is determined by the camera is used as the reference frame. This frame is indicated in buffer 504A of FIG. 5 as 0 Ev, i.e. uncompensated. The other frames are de-ghosted against the reference frame. In addition, the reference image is processed in pairs with the two target images. This can be presented as 2 pairs in a 3 frame process.

Figure 5:
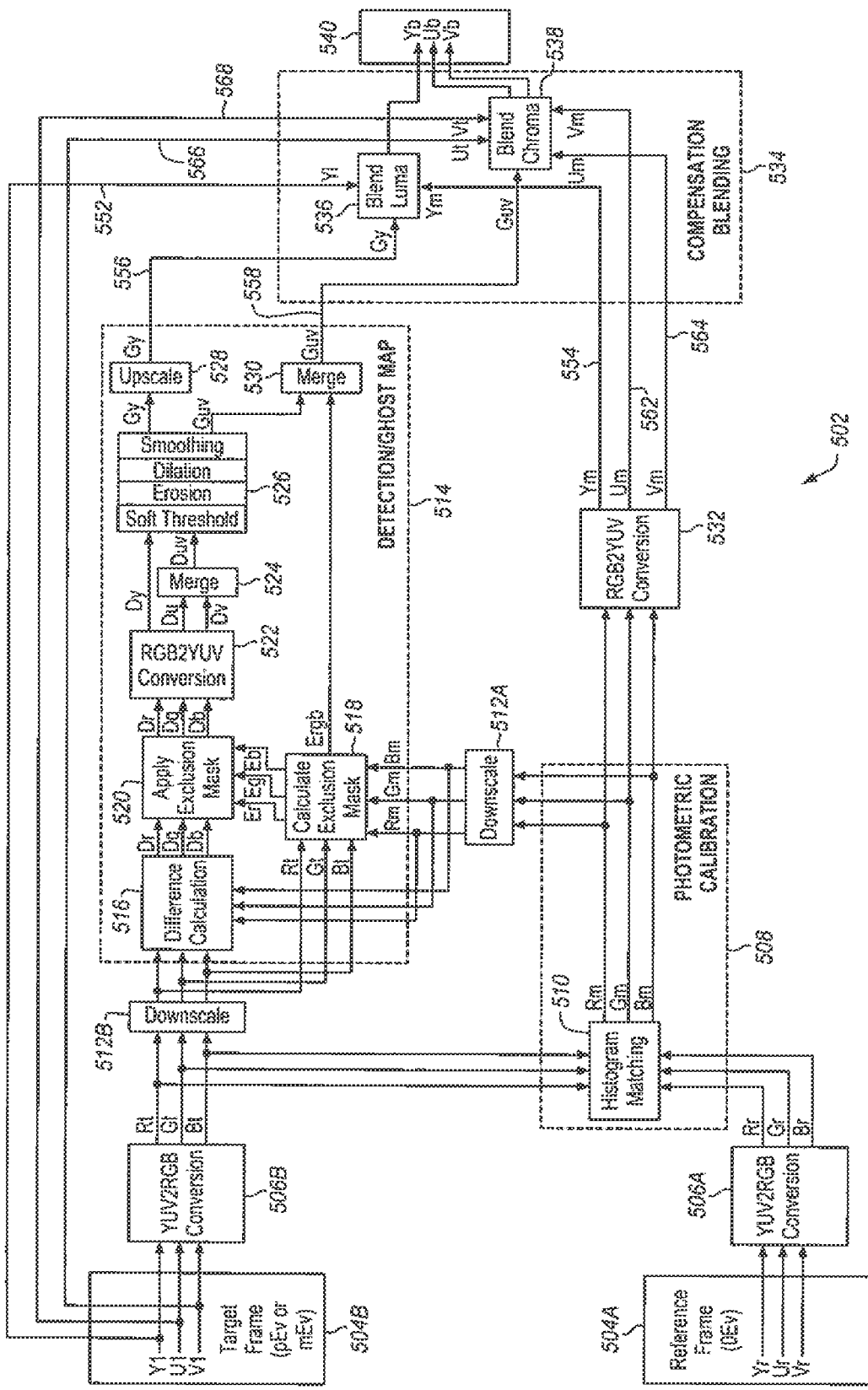
FIG. 5 is a block diagram of a de-ghosting processing pipeline according to an embodiment.

FIG. 5 shows a de-ghosting processing pipeline 502 for one of either of the two pairs of images. The reference image 504A and a secondary image 504B, which may be either the over exposed or the under exposed image. An identical block will process the second pair and additional blocks will process any more pairs if there are more than three images. The two images of the pair for this pipeline are retrieved from respective buffers 504A, 504B and are both converted from their original YUV color space to an RGB color space. The reference image is taken from a buffer 504A and applied to an RGB converter 506A and from there applied into photometric calibration 508. Similarly, the secondary image, indicated as pEv or mEv, i.e. plus or minus some amount from the Ev (Exposure value) of the reference frame, is taken from a buffer 504B and converted to an RGB color space 506B and then applied to photometric calibration like the first image. The RGB color space is preferred for the ghost detection, however, these operations may be performed in any of a variety of different color spaces depending upon the particular implementation.

The RGB image from the reference image and the secondary image are both applied to histogram matching 510 within the photometric calibration 508. Here the relative illumination for each of the R, G, and B components is compared and matched pixel for pixel. After the histogram has been developed, the reference frame is down scaled 512A and the secondary frame is also down scaled 512B. These two down scaled images are applied to a detection or ghost map module 514. Both images are applied to a difference calculation 516 and to exclusion mask 518.

Through the difference calculations, the differences between the color values in the two images are determined. An exclusion mask 518 is applied to determine if any regions of either image should be excluded from the ghost detection 514. Typically an area will be excluded because it is so over-exposed as to not contain any useful information or so under-exposed as to contain primarily noise. The exclusion mask parameters are evaluated from the histogram 510 to determine which regions of the pair of images may be so over exposed or under exposed that they should be excluded from the ghost detection. The exclusion mask 518 is applied in an application block 520. This provides a map of the reference image indicating which areas may be taken from the secondary image and from the primary image and which areas should not be. The exclusion mask prevents areas of the image with insufficient information from being used in the ghost detection. This reduces computational complexity.

By evaluating the images with the histogram and generating an exclusion mask in the RGB color space, a more accurate view of over and under-exposure is obtained. In the YUV space there may be cross talk between the three channels (Y, U, and V) of the images that can obscure the results. The resulting combined image is reconverted back to a YUV color space in a conversion block 522 before the ghost detection occurs. The U and V elements are merged in a merger block 524 before the ghost detection occurs then the Y and the combined UV components are processed for ghost detection at a processing block 526.

The ghost detection operations typically include a soft threshold, erosion, dilation, and smoothing. The Y components are then scaled back to the full resolution in upscale block 528 whereas the UV components are merged with the exclusion mask results 518 in a merger block 530. These operations in the ghost detection and mapping are used for compensation blending 534. The compensation blending includes a luma blending 536 and a chroma blending 538. The luma blending takes the Y components from the ghost detection and upscaling 528 and combines that with the original Y components from the primary and secondary images. The ghost detection Y values are used to factor the Y components from the two images and the luma blending block 536. In a similar way, the U and V components from the two images are applied to a chroma blending block and the ghost detection UV values are then used to control the chroma blending 538 in the compensation blending block 534. After these blending operations an output ghost-detected YUV image is produced.

In the illustrated example, the described processes may be divided into three major functional blocks, photometric calibration or matching 508, motion detection or ghost mapping 514, and motion compensation or blending 534.

The photometric calibration performs brightness matching of the reference image to the target image. This modifies the reference image so that it has the same exposure as the target image. Photometric calibration is done using the histogram matching 510 on each RGB channel separately. As shown the converted 506A, 506B images from the frame buffers 504A, 504B are both applied to a histogram matching function to compare the brightness levels in the RGB color space. The results are applied to adjust the reference frame before the compensation blending. The results are also used to determine the exclusion mask.

Motion detection compares the target frame with the photometric calibrated reference frame. This is to obtain a ghost map which marks the regions affected by motion. Detection may be done on dowascaled 512A, 512B images in two or more operations.

The first operation is to generate a difference map 516 with region exclusion 508. The difference is determined for each RGB channel of each image pair. The second operation is saturated region exclusion 518. Regions affected by sensor saturation are masked and their difference is set to 0. The signed RGB is then converted 522 to YUV space in which motion compensation is done. The region exclusion process 528 may also be used to produce one integral exclusion mask used later in the pipeline at block 530.

After the exclusion masks are applied and the image is converted to YUV, the U and V maps are combined 524 into a single UV map. The combining prevents false ghost detection. The combined UV and the Y components are then applied to several ghost detection operations. First, a soft threshold operation applies a threshold to each of Y and UV maps. The threshold may be any sigmoid function or linear slope piece-wise linear function.

Erosion, dilation, and smoothing operations are then applied to the thresholded image. Erosion is a morphological operation which is used for removing sparse detections caused by noise. Dilation makes the ghost map more compact by blowing up detections after erosion. Smoothing filters the ghost map with a low pass filter so that no visible seams remain after blending.

The UV component is then merged 530 with the exclusion mask. In order to prevent artifacts in blending, each of the individual YUV masks are combined with integral exclusion masks using, for example, a fuzzy logical "and" operation.

In the illustrated example, motion compensation 534 is done in the YUV domain because the YUV color space de-correlates the luma and chroma components. The U, V components 562 564 of the photometric calibrated reference frame, converted back to YUV 532, are alpha blended 538 with the corresponding U, V components 566, 568 of the target frame 504B using the ghost map 530 as an alpha mask. Y channels 552, 554 are blended 536 using a Y mask 556 from the ghost detection. U and V channels are blended using a UV mask 558 from the ghost detection.

Luminance processing 316 is performed in some embodiments of this HDR processing as a tone mapping operator. Luminance processing recovers saturated regions and brightens dark regions of the image without producing visible artifacts. Inputs to the luminance processing are luma planes of the motion compensated frames from the de-ghosting stage 314.

Figure 6:
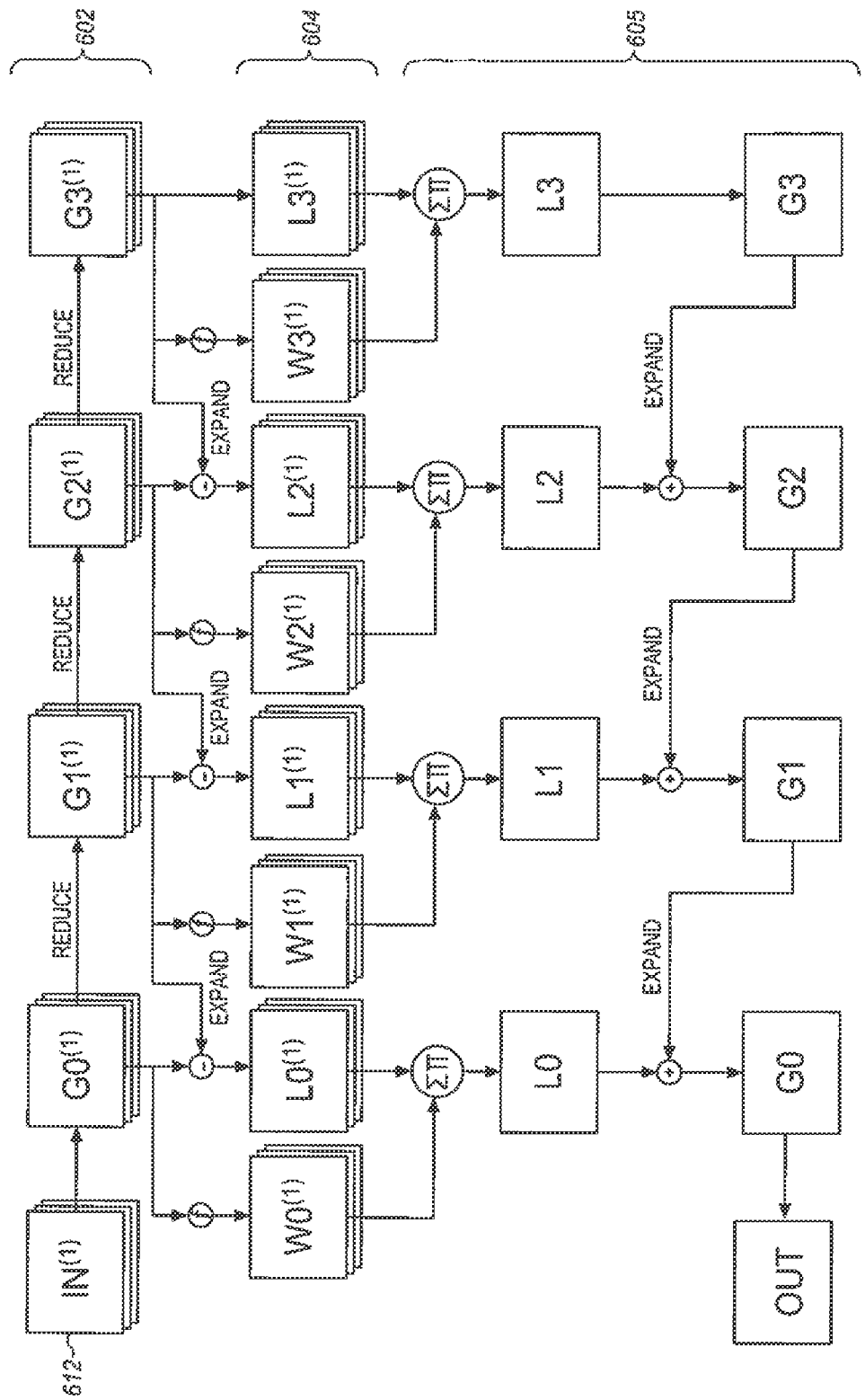
FIG. 6 is a block diagram of a luminance processing pipeline according to an embodiment.

For seamless blending, a Gaussian and Laplacian pyramids framework may be used. As shown in the processing flow diagram of FIG. 6, the entire pipeline may be viewed as having three stages, pyramid decomposition 602, weight calculation 604, and blending and pyramid reconstruction 606.

In pyramid decomposition, each of the input frames 612 (IN(1,2,3)) is decomposed into Gaussian (G0(1, 2, 3), G1(1, 2, 3), G2(1,2,3), G3(1,2,3)) and Laplacian pyramids (L0(1, 2, 3), L1(1, 2, 3), L2(1,2,3), L3(1,2,3). Each differently exposed input luminance is decomposed into a Gaussian pyramid through a reduction process. For each pyramid level l (l=0, 1, ..., N−1), the image is smoothed with a 5×5 Gaussian convolution filter and decimated in order to get level l+1.

In the weight maps stage, blending weights W0(1, 2, 3), W1(1, 2, 3), W2(1,2,3), W3(1,2,3) are computed. Weight maps are computed at each pyramid level for each of the frames (1,2,3). The normally exposed frame may be used as a reference and two weight maps are calculated. An underexposed weight map is calculated by applying piece wise linear metrics on the luma channel of the underexposed frame mEv. Metrics are used to give a high weight to the bright pixels of the underexposed luma channel. The procedure is repeated for the overexposed frame to obtain an overexposed weight map. Metrics for the overexposed frame give a high weight to the dark pixels. These two masks are inverted and multiplied to obtain a weight map for the auto exposed or reference frame. This approach avoids a division based normalization which makes it more suitable for a fixed-point image signal processor.

For blending and reconstruction, the expansion operator is similar to the reduction operator. The images are interpolated and then filtered with a 5×5 Gaussian filter. Coefficients in the output Laplacian pyramid (L0, L1, L2, L3) are computed as a weighted sum of the input Laplacian coefficients. The output Laplacian pyramid is then applied to each Gaussian (G0, G1, G2, G3) and reconstructed in order to output a luminance plane (OUT).

The luminance processing stage 316 outputs luma. Color processing is done in a separate stage 318 called chromaticity processing which is responsible for accurate color reproduction. Using separate operations reduces color bleeding on the output image. The chromaticity processing takes color from each of the input (motion-compensated) frames where they have the best signal-to-noise ratio. Color in dark regions is taken from the overexposed frame, color from the bright or saturated regions is taken from the underexposed frame, and the other colors are taken from the auto-exposed or reference frame. The chromaticity operations may be organized in a cascade manner, so that the pipeline can take any number of frames as an input. Luma and chroma processing may be done at the same time, in parallel, and the results then combined to produce the final HDR frame.

Figure 7A:
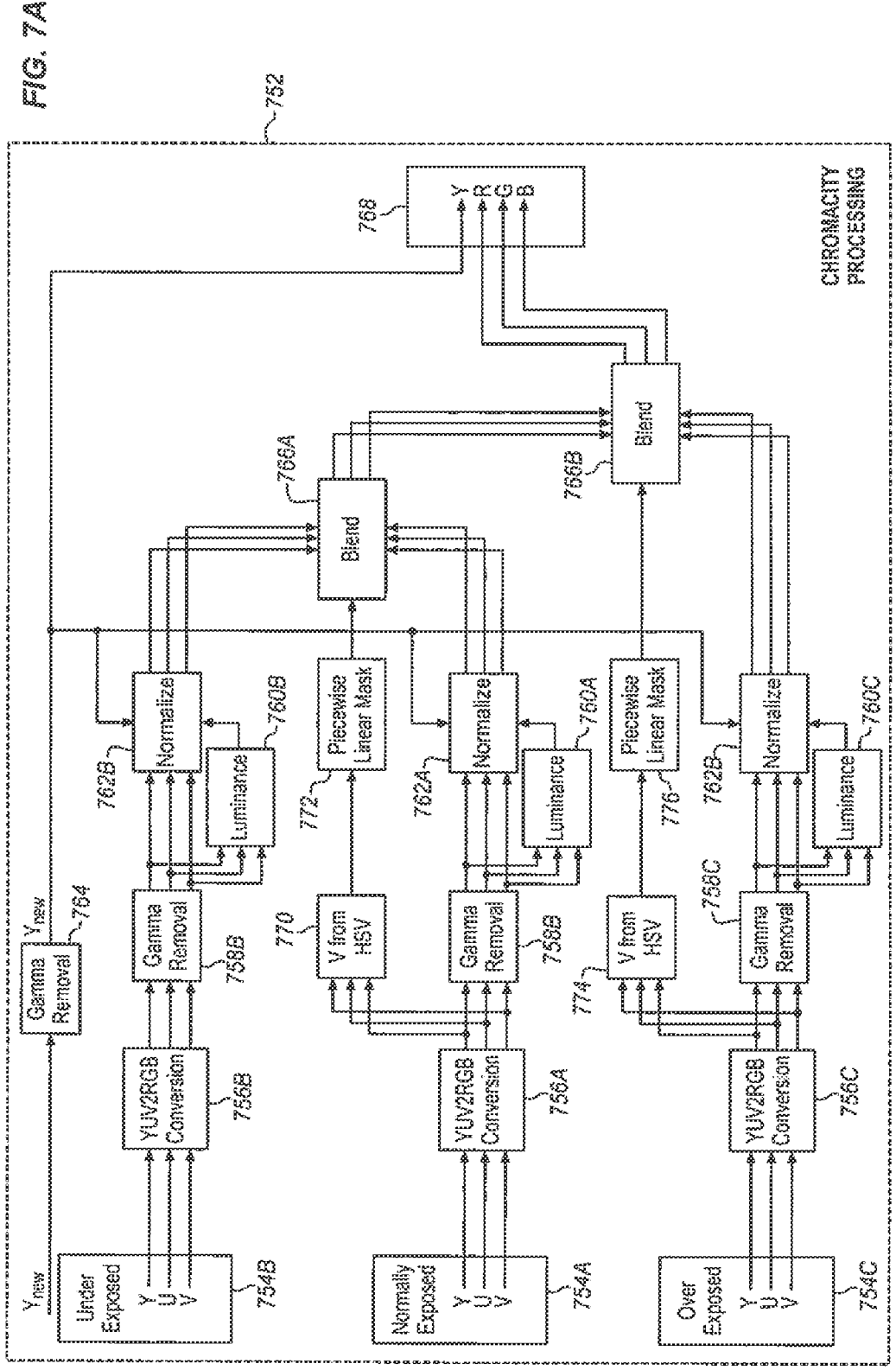
FIG. 7A is a block diagram of a chromaticity processing pipeline according to an embodiment.

FIG. 7A provides an example of the chromaticity processing 318 mentioned above. In the chroma processing there is a chroma processing pipeline 752. In the example of FIG. 7A all three images are received, a buffer contains the reference frame 754A and the two secondary frames, the under exposed frame 754B and the over exposed frame 754C. Each of these YUV images are converted first to RGB images in conversion blocks 756A, 756B and 756C. From here a gamma removal is applied to each of the images in a gamma removal block 758A, 758B and 758C. From gamma removal the luma values of each image are determined in a luma analysis block 760A, 760B and 760C. These luma determinations are applied to normalize the RGB values for each image.

Each processing chain has a normalizing block 777A, 777B and 777C to normalize the values based on the determined luma. The normalize blocks also receive a gamma removal component 764 applied to each of the normalize blocks to remove any impact of the gamma on the normalized RGB values. The normalized RGB values are then blended pair wise. In the example of FIG. 7A, the first pair is the reference image with the under exposed image 754B. These two images are then applied to a blending block 766A. The output of that blending block is applied to a second blending block 766B which also receives the over exposed secondary image.

The secondary block 766B then produces a final output chroma blended block 768. This is in a YRGB color space. For the blending, the blending operations are guided in part by a V value derived from an HSV (Hue Saturation Value) analysis of the original RGB image. The V value is derived from one of the images and sent to the blender. In the example of the first blender 766A, an HSV conversion can be made from the RGB value. The V (Value) from the HSV image is extracted in an extraction block 770 and this V value is provided to a piecewise linear mask 772. The masked V value is then applied to the blender to guide the blending process. As mentioned above, the images have already had exclusion masks to remove any influence of extreme over or under exposure on the images. Similarly, for the second pairing a V value may be taken from the over exposed image 754C in a second V extraction block 774 which is applied to a piecewise linear mask 776 as an input to guide the second blender 766B.

As shown each cascade stage may be considered in several steps. First there is a YUV to RGB conversion 756. Then there is normalization 762 and blending 766 done in a linear RGB color space. Accordingly, an early operation is to convert the images to nonlinear RGB space. The converted images are then linearized. In this example, the nonlinear RGB images are linearized by use of an inverse gamma curve 758, 760. As described above, the inverse gamma curve is also applied to the luma channel from the luminance processing stage in order to obtain an approximate luminance channel.

A blending mask is generated by applying piece-wise linear metrics 772, 776 on the $M=\max(R, G, B)$ value of each pixel. The output luminance is then normalized 762 to the output luminance. Each channel is normalized to the output luminance by $Cnew=C(Ynew/Y)$, where C is each of the RGB channels, and Y is the luminance. The normalized images are then alpha-blended 766 using the blending mask calculated previously.

An irradiance map may be used to represent the distribution of the light that falls on the image sensor. The map may be used to occupy a larger dynamic range than is captured by any one image and, for that reason, may use a larger bit range than an individual image. Typically, an irradiance map uses, for example, 16 bits per channel instead of a standard 8 bits. However, the number of bits may be adapted to suit different implementations. The irradiance map may be used as an input for high-contrast displays that support this larger bit range, and also for tone mapping operators. Tone mapping operators may be used to convert a high contrast image into e.g. 8 bits per channel image or to create artistic effects for an image.

Figure 7B:
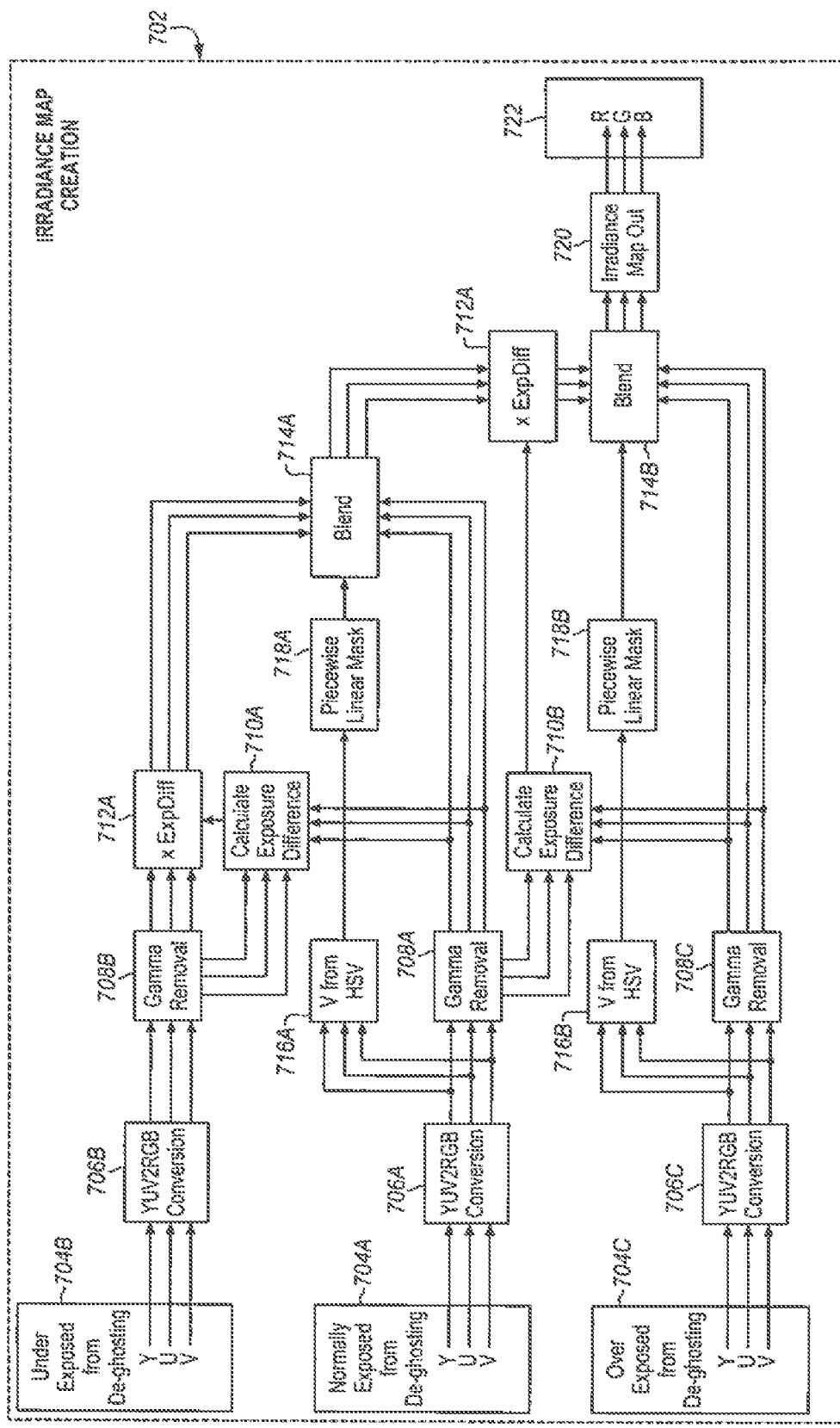
FIG. 7B is a block diagram of an irradiance map processing pipeline according to an embodiment.

FIG. 7B shows an example of an irradiance map creation module 702. This may be a part of the chromaticity processing module of FIG. 7A, but is shown separately here to make the processing pipeline easier to understand. This module receives the three images after de-ghosting into respective buffers for the reference frame 704A, the under exposed frame 704B and the over exposed frame 704C. As mentioned above, these are all in YUV format. They are accordingly converted back to RGB format in respective conversion blocks 706A, 706B and 706C. In the conversion blocks the gamma values are removed in gamma removal blocks 708a, 708B and 708C to prevent the gamma values from affecting the irradiance map.

The gamma removed images are forwarded to pairwise processing. Accordingly, the gamma removed reference image is then applied to a comparison block 710A that compares the exposure values or irradiance of the gamma removed reference image to the gamma removed under exposed image. This exposure difference is then saved and determined in an exposure difference block 712A. The results of which are applied to a blender 714A. The blender 714A receives the reference image after gamma removal and the exposure difference calculation from module 712A. This blender is guided by the V value extracted from an HSV representation of the reference image 716A. This V value is applied from an extraction unit 716A to a piecewise linear mask 718A to drive the blender. This blended image is then applied to a comparison with the over-exposed image 704C.

As with the first pair, the second pair consisting of the reference image and the over exposed image takes the over exposed image and applies that to a second blender 716B. This blender receives the extracted V component from an extraction block 716B out of the over exposed secondary image. This V element is applied to a piecewise linear mask 718B as an input into the blender. The other input into the blender is an exposure difference calculation 710B which compares the reference image to the over exposed image. This exposure difference is applied to a second exposure difference calculator 712B which receives the blended image from the first pair 714A. The result is applied as the comparison image into the blender to be compared to the over exposed image 704C. The results of this blending are used to produce an irradiance map 720 which is then applied into a buffer as an irradiance RGB value 722.

YUV frames generated by the de-ghosting module 514 may be used as input for this module. The conversion to the RGB color space 706, the removing of gamma 708, the generation of blending factors using piecewise linear masks 718, and the blending itself 714 may all be done in a similar manner as in the previous modules. The exposure difference calculation blocks 712 create a matched histogram, or com-paragram, between the gamma removed and linearized frames. The exposure difference between pixels in input frames can be used to add pixels from a lower exposed frame as a multiplication factor using the calculated difference before blending.

Figure 8:
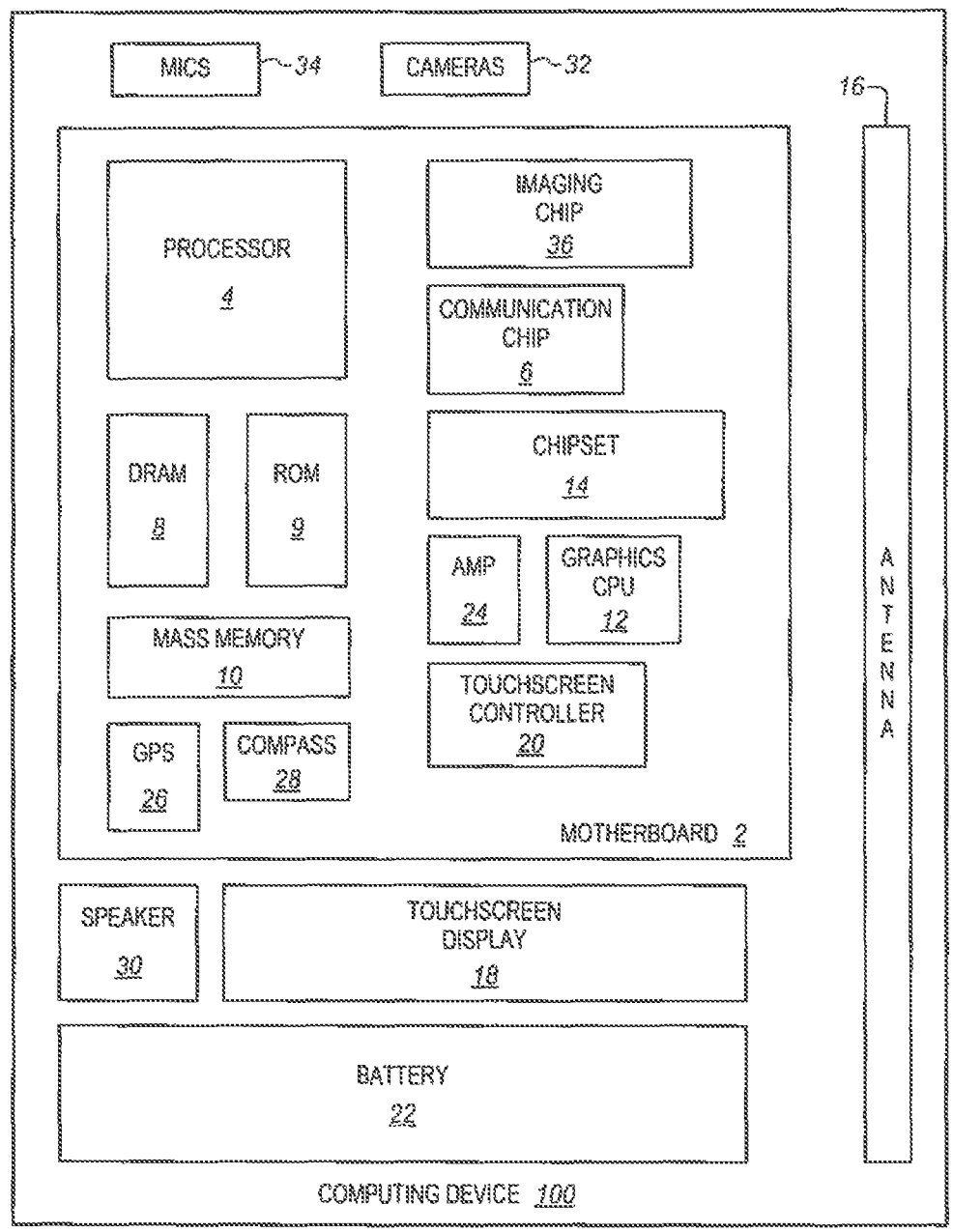
FIG. 8 is a block diagram of a photographic device incorporating high dynamic range capture according to an embodiment.

FIG. 8 illustrates a portable image capture device 100 in accordance with one implementation. The imaging device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, one or more cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36, such as an imaging signal processor and to the processor 4, either directly or through the image chip. The image chip may take as variety of different forms, such as a graphics co-processor, or a separate dedicated imaging management module. Such a module or device may comprise logic, algorithms, and/or instructions operative to capture, process, edit, compress, store, print, and/or display one or more images. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as OPS, EDGE, GPRS, COMA, WiMAX, Ev-DO, and others.

The cameras 32 may include all of the components of the camera 102 of FIG. 1 or share resources, such as memory 8, 9, 10, processing 4 and user interface 12, 20, with other video device components and functions. The processor 4 is coupled to the camera and to memory to receive frames and produce HDR images as described. The cameras may also include an image processing system, as described above, to share tasks with the processor to generate HDR images.

In various implementations, the image capture device 100 may be a video camera, a digital single lens reflex or mirror-less camera, as cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a high dynamic range image processing system that includes a buffer to receive each of three different images of a scene, each image having a different amount of light exposure to the scene, a general purpose processor to estimate the alignment between the three images, and an imaging processor to warp the images based on the estimated alignment and to combine the three images to produce a single high dynamic range image.

In further embodiments the general purpose processor estimates alignment for a second pairing of the three images while the imaging processor warps images for a first pairing of the three images.

In further embodiments the imaging processor groups the three images into two pairs, a first pair and a second pair, each pair including a reference image selected from the three images, and wherein the general purpose processor operates on the second pair while the imaging processor operates on the first pair. The general purpose processor estimates pairwise image alignment. The imaging processor performs pairwise image warping, de-ghosting, and chroma processing. The general purpose processor is a central processing unit and the imaging processor is incorporated into a camera module.

Some embodiment pertain to a method for processing images to compose a high dynamic range image, that includes receiving each of three different images of a scene in a buffer, each image having a different amount of light exposure to the scene, estimating the alignment between the three images in a general purpose processor, and warping the images based on the estimated alignment and combining the three images in an imaging processor to produce a single high dynamic range image.

Further embodiments include estimating alignment for a second pairing of the three images in the general purpose processor while warping images for a first pairing of the three images in the imaging processor.

In further embodiments the imaging processor groups the three images into two pairs, a first pair and a second pair, each pair including a reference image selected from the three images, and wherein the general purpose processor operates on the second pair while the imaging processor operates on the first pair.

Some embodiments pertain to a method that includes receiving at least two images, each representing a same scene at a different time and having a different exposure level, computing differences in color values between a first image and a second image, determining that a region of a first one of the images is excluded, excluding the excluded region from the computed differences, using the color values from a region of the second image that corresponds to the excluded region as a computed difference, determining ghost detection values using the computed differences, generating a combined image using the ghost detection values and the color values of the corresponding region, and blending luma and chroma values of the combined images based on the de-ghosting.

In further embodiments determining whether a region is excluded comprises determining whether a region is saturated. Determining whether a region is saturated comprises examining histograms of the first and second images. Determining whether a region is excluded comprises determining whether a region has excessive noise by examining histograms of the first and second images. The images each comprise multiple color components and wherein determining whether a region is excluded is done independently for each color component.

In further embodiments the at least two images are in a YUV color space, the method further comprising converting the at least two images to an RGB color space before computing a difference in color values and converting the at least two images to YUV color space before determining ghost detection values. Determining ghost detection values is done independently for a Y component and for a combined UV component.

Some embodiments pertain to a high dynamic range image processing system that includes a buffer to receive at least two images, each representing a same scene at a different time and having a different exposure level, a difference calculation module to compute differences in color values between a first image and a second image, an image exclusion module to determine that a region of a first one of the images is excluded, to exclude the excluded region from the computed differences, and to use the color values from a region of the second image that corresponds to the excluded region as a computed difference, a ghost detection module to determine ghost detection values using the computed differences, and a blending module to generate a combined image using the ghost detection values and the color values of the corresponding region, and to blend luma and chroma values of the combined images based on the de-ghosting.

In further embodiments the at least two images are in a YUV color space, the system further comprising a color space converter to convert the at least two images to an RGB color space before the difference calculation module and a second color space converter to convert the at least two images back to YUV color space before the ghoste detection module. The ghost detection module further comprises a combiner to merge the U and V components and wherein the ghost detection module determines ghost detection values independently for a combined UV component and for a Y component.

Some embodiments pertain to a method that includes warping a second image so that it is aligned with a first image, wherein the first image and the second image are captured images of a same scene at different times, the images including color information and being represented in a color space having multiple color components, removing gamma from the first image and the second image, normalizing the luminance of the first image and the second image after removing the gamma, and blending the first image and the second image using a luminance value from the first image to obtain a single image with color and luminance information from both images.

Further embodiments include generating an HSV representation of the first and the second image, extracting a V value from the HSV representation, applying the V value to a piecewise linear mask and using the result to drive the blending of the first and the second image.

Some embodiments pertain to a portable camera that includes a camera having an image sensor to produce at least two images, each representing a same scene at a different time and having a different exposure level, a buffer to receive the at least two images, a difference calculation module to compute differences in color values between as first image and to second image, an image exclusion module to determine that a region of a first one of the images is excluded, to exclude the excluded region from the computed differences, and to use the color values from a region of the second image that corresponds to the excluded region as a computed difference, a ghost detection module to determine ghost detection values using the computed differences, a blending module to generate a combined image using the ghost detection values and the color values of the corresponding region, and to blend luma and chroma values of the combined images based on the de-ghosting, and a display to render the combined image to a user.

What is claimed is:

1. A high dynamic range image processing system comprising:
    a buffer to receive each of three different images of a scene, the three images comprising a first image, a second image and a reference image, each image having a different amount of light exposure to the scene;
    a general purpose processor to estimate the alignment between a first pair of the three images consisting of the first image and the reference image using diagrams of image borders and to send a first set of warping parameters for the first pair to an imaging processor, the general purpose processor to then estimate the alignment between a second pair of the three images consisting of the second image and the reference image using diagrams of image borders and to send a second set of warping parameters for the second pair to the imaging processor; and
    the imaging processor to receive the first set of warping parameters from the general purpose processor, to receive the first pair of images from the buffer, and to warp the images of the first pair based on the estimated alignment by rotating the first image so that the borders align with that of the reference image, during the time that the general purpose processor estimates the alignment for the second pair of images,
    the imaging processor further to receive the second set of warping parameters from the general purpose processor, to receive the second image from the buffer, and to warp the images of the second pair based on the second estimated alignment by rotating the second image so that the borders align with that of the reference image after the general purpose processor estimates the alignment for the second pair of images,
    the imaging processor further to combine the three images after rotating the first and the second to produce a single high dynamic range image.

2. The system of claim 1, wherein the imaging processor further downscales resolution of the three images, wherein the general purpose processor estimates alignment using the downscaled images, wherein the imaging processor downscales resolution of the second image during the time that the general processor estimates alignment for the first pair of images.

3. The system of claim 1, wherein the general purpose processor estimates alignment of the second pair while the imaging processor performs warping on the first pair.

4. The system of claim 3, wherein the general purpose processor estimates pairwise image alignment.

5. The system of claim 4, wherein the imaging processor performs pairwise image warping, de-ghosting, and chroma processing.

6. The system of claim 1, wherein the general purpose processor is a central processing unit and the imaging processor is incorporated into a camera module.

7. The system of claim 1, wherein the general purpose processor is further to:

compute differences in color values between the three images;

determine that a region of a first one of the images is excluded;

exclude the excluded region from the computed differences;

use the color values from a region of the second image that corresponds to the excluded region as a computed difference, and wherein the imaging processor is to combine the three images excluding the excluded region.

8. The system of claim 7, wherein determining that a region is excluded comprises determining whether a region is saturated.

9. The system of claim 8, wherein determining whether a region is saturated comprises examining histograms of the three images.

10. The system of claim 7, wherein determining that a region is excluded comprises determining whether a region has excessive noise by examining histograms of the three images.

11. The system of claim 7, wherein the three images each comprise multiple color components and wherein determining that a region is excluded is done independently for each color component.

12. The system of claim 11, wherein the three images are in a YUV color space, and wherein the imaging processor further converts the three images to an RGB color space before computing a difference in color values.

13. The system of claim 1, wherein the imaging processor combines the three images by:

removing gamma from the three images;

normalizing the luminance of the three images after removing the gamma; and blending the three images using a luminance value from a reference image of the three images to obtain a single image with color and luminance information from the three images.

14. The system of claim 13, wherein blending comprises generating an HSV representation of the three images, extracting a V value from the HSV representation, applying the V value to a piecewise linear mask and using the result to drive the blending of the three images.

15. A portable camera comprising:

a camera having an image sensor to produce three images of a scene, the three images comprising a first image, a second image, and a reference image, each image representing the same scene at a different time and having a different exposure level;

a buffer to receive each of three images of a scene, each image having a different amount of light exposure to the scene;

a general purpose processor to estimate the alignment between a first pair of the three images consisting of the first image and the reference image using diagrams of borders and to send a first set of warping parameters for the first pair to an imaging processor, the general purpose processor to then estimate the alignment between a second pair of the three images consisting of the second image and the reference image using diagrams of image borders and to send a second set of warping parameters for the second pair to the imaging processor; and the imaging processor to receive the first set of warping parameters from the general purpose processor, to receive the first pair of the images from the buffer, and to warp the images of the first pair based on the estimated alignment by rotating the first image so that the borders align with that of the referenced image, during the time that the general purpose processor estimates the alignment for the second pair of images, the imaging processor further to receive the second set of warping parameters from the general purpose processor, to receive the second image from the buffer, and to warp the images of the second pair based on the second estimated alignment by rotating the second image so that the borders align with that of the reference image after general purpose processor estimates the alignment for the second pair of images, the imaging processor further to combine the three images after rotating the first and the second image to produce a single high dynamic range image.

16. The portable camera of claim 15, wherein the general purpose processor is further:

to compute differences in color values between a first image and a second image;

to determine that a region of a first one of the images is excluded;

to exclude the excluded region from the computed differences, and to use the color values from a region of the second image that corresponds to the excluded region as a computed difference, wherein the imaging processor combines the three images using the color values of the corresponding region.

17. A method comprising:

buffering each of three images of a scene, the three images comprising a first image, a second image and a reference image, each image having a different amount of light exposure to the scene;

estimating the alignment between a first pair of the three images consisting of the first image and the reference image in a general purpose processor using diagrams of borders;

sending a first set of warping parameters for the first pair from the general purpose processor to an imaging processor, estimating the alignment between a second pair of the three images consisting of the second image and the reference image in the general purpose processor using diagrams of image borders;

receiving the first set of warping parameters from the general purpose processor, receiving the first pair of images from the buffer and warping the images of the first pair at the imaging processor based on the estimated alignment by rotating the first image so that the borders align with that of the referenced image during the time that the general purpose processor estimates the alignment for the second pair of images;

sending a second set of warping parameters for the second pair from the general purpose processor to the imaging processor;

receiving the second set of warping parameters from the general purpose processor, receiving the second image from the buffer, and warping the second pair of images in the imaging processor based on the estimated alignment by rotating the second image so that the borders align with that of the reference image after general purpose processor estimates the alignment for the second pair of images; and combining the three images in the imaging processor after rotating the first and the second image to produce a single high dynamic range image.

18. The method of claim 17, further comprising estimating alignment for a second pairing of the three images in the general purpose processor while warping images for a first pairing of the three images in the imaging processor.

19. The method of claim 17, wherein the general purpose processor estimates alignment of the second pair while the imaging processor performs warping on the first pair.

20. The method of claim 17, further comprising:
removing gamma from the three images;
normalizing the luminance of the three images after removing the gamma, and
wherein combining further comprises blending the three images using a luminance value from one of the three images to obtain a single image with color and luminance information from the three images.

21. The method of claim 20, wherein the images each comprise multiple color components in a YUV color space, the method further comprising converting the three images to an RGB color space before computing a difference in color values and converting the at least two images to YUV color space before combining the three images.

22. The method of claim 17, further comprising:
computing differences in color values pair-wise between the three images;
determining that a region of a first one of the images is excluded;
excluding the excluded region from the computed differences;
using the color values from a region of a second image that corresponds to the excluded region as a computed difference, and
wherein combining the three images comprises using the color values of the corresponding region.

* * * * *